H. O. SCRANTON.
SHEARS FOR RICE STRAW.
APPLICATION FILED NOV. 28, 1919.
1,359,752.  Patented Nov. 23, 1920.
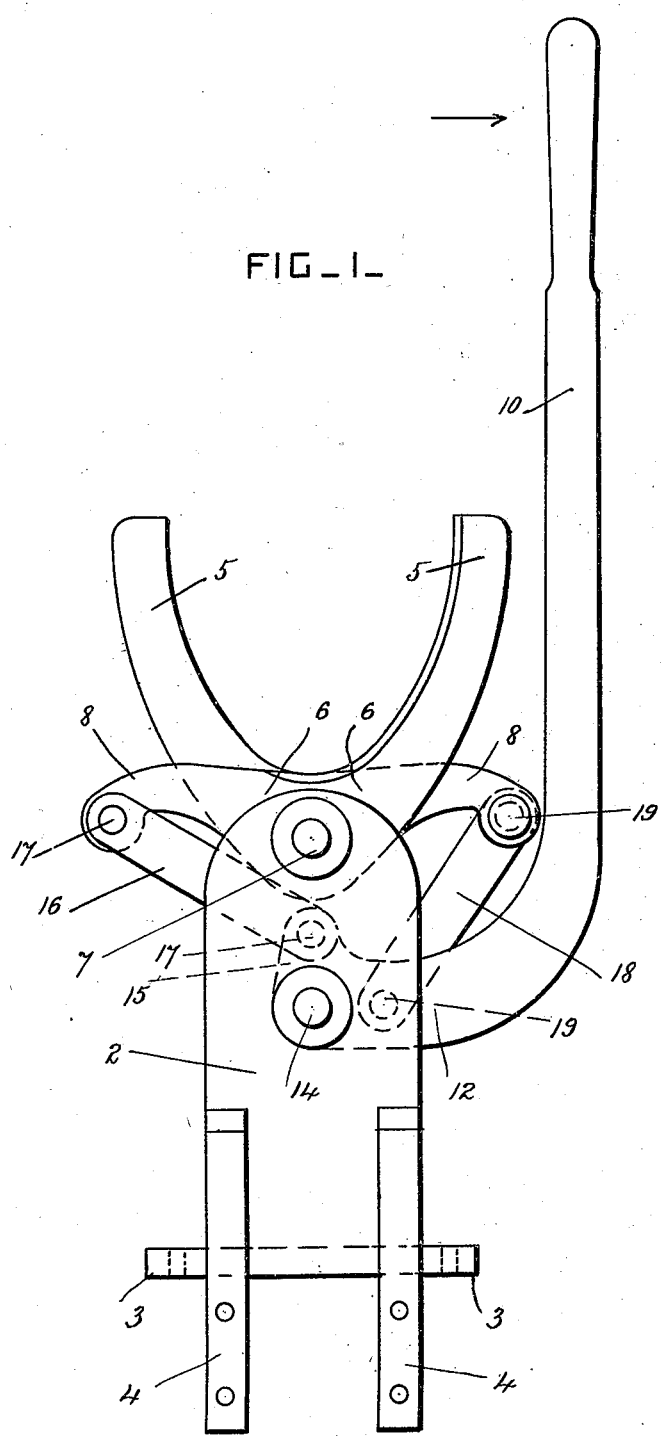
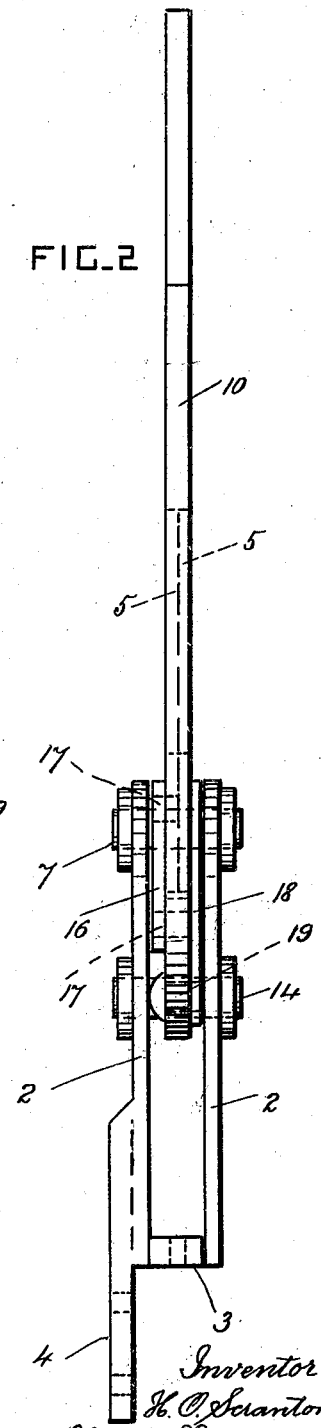
Inventor
H. O. Scranton.
by Herbert W. Jenner.
Attorney.

UNITED STATES PATENT OFFICE.

HENRY OSBERT SCRANTON, OF JEANERETTE, LOUISIANA.

SHEARS FOR RICE-STRAW.

1,359,752.   Specification of Letters Patent.   Patented Nov. 23, 1920.

Application filed November 28, 1919. Serial No. 341,127.

*To all whom it may concern:*

Be it known that I, HENRY O. SCRANTON, a citizen of the United States, residing at Jeanerette, in the parish of Iberia and State of Louisiana, have invented certain new and useful Improvements in Shears for Rice-Straw, of which the following is a specification.

This invention relates to shears specially adapted for cutting bundles of rice straw in the harvesting field; and it consists of pivoted shear blades mounted on a frame which is secured to the cart or other vehicle for removing the rice from the field and arranged and operated as hereinafter fully described and claimed.

In the drawings, Figure 1 is a front view of the shears constructed according to this invention. Fig. 2 is an end view of the same.

In harvesting rice, the rice after being cut is tied in bundles which are stood in the field with the heads of rice uppermost, and as the field is often wet and is sometimes flooded the lower portions of the rice straw become saturated with water and have to be chopped off or otherwise removed before the heads can be threshed satisfactorily.

In carrying out this invention, a frame is provided having two parallel plates 2 arranged vertically and provided at their bases with lugs 3 and arms 4 for securing them to one side of a cart, sled or other receptacle adapted to remove the rice from the field.

Two curved shear blades 5 are provided and have crossed and pivoted shanks 6 which are pivoted between the plates on a horizontal pin 7. The shanks have laterally projecting arms 8 which are normally horizontal when the blades are in the open position as shown in Fig. 1. When open, the upper parts of the blades are substantially vertical, and form a U-shaped figure, so that the bundles of rice straw can be placed between the blades one after another.

The blades are operated by means of a lever 10 having a curved lower end portion 12 which is pivoted between the plates 2 on a pin 14, arranged horizontally and under the pin 7. A short arm 15 projects upwardly from the lever above its pivot. A link 16 is pivoted to the short arm 15 and to one of the arms 8 by pins 17; and a similar link 18 is pivoted to the other arm 8 and to the curved portion 12 of the lever by pins 19.

When the shear blades are in the open position, the lever 10 projects upwardly above them and is substantially vertical. A bundle of rice straw is placed between the blades, and the lever 10 is moved outwardly by hand in the direction of the arrow in Fig. 1, thereby severing the bundle. The heads of the rice fall into the cart or receptacle, and the wet straw drops onto the ground. The use of the links and arms enables a whole bundle of rice straw to be cut through at each stroke of the hand lever, and any rice which is shaken out of the heads falls into the cart.

What I claim is:

In a shears for cutting bundles of straw, a supporting frame, a pair of upwardly projecting blades pivoted in the frame on a single pivot and having crossed shanks provided with laterally projecting arms, an operating lever having a curved lower portion pivoted in the frame directly under the pivot of the blades and having a straight upper portion which projects vertically to a point above the tops of the blades, said lever having also a lug which projects upwardly in the space above its pivot, a link pivotally connecting one of the said arms with the said lug, and a link pivotally connecting the other arm with the curved lower portion of the lever to one side of its pivot.

In testimony whereof I have affixed my signature.

HENRY OSBERT SCRANTON.